UNITED STATES PATENT OFFICE.

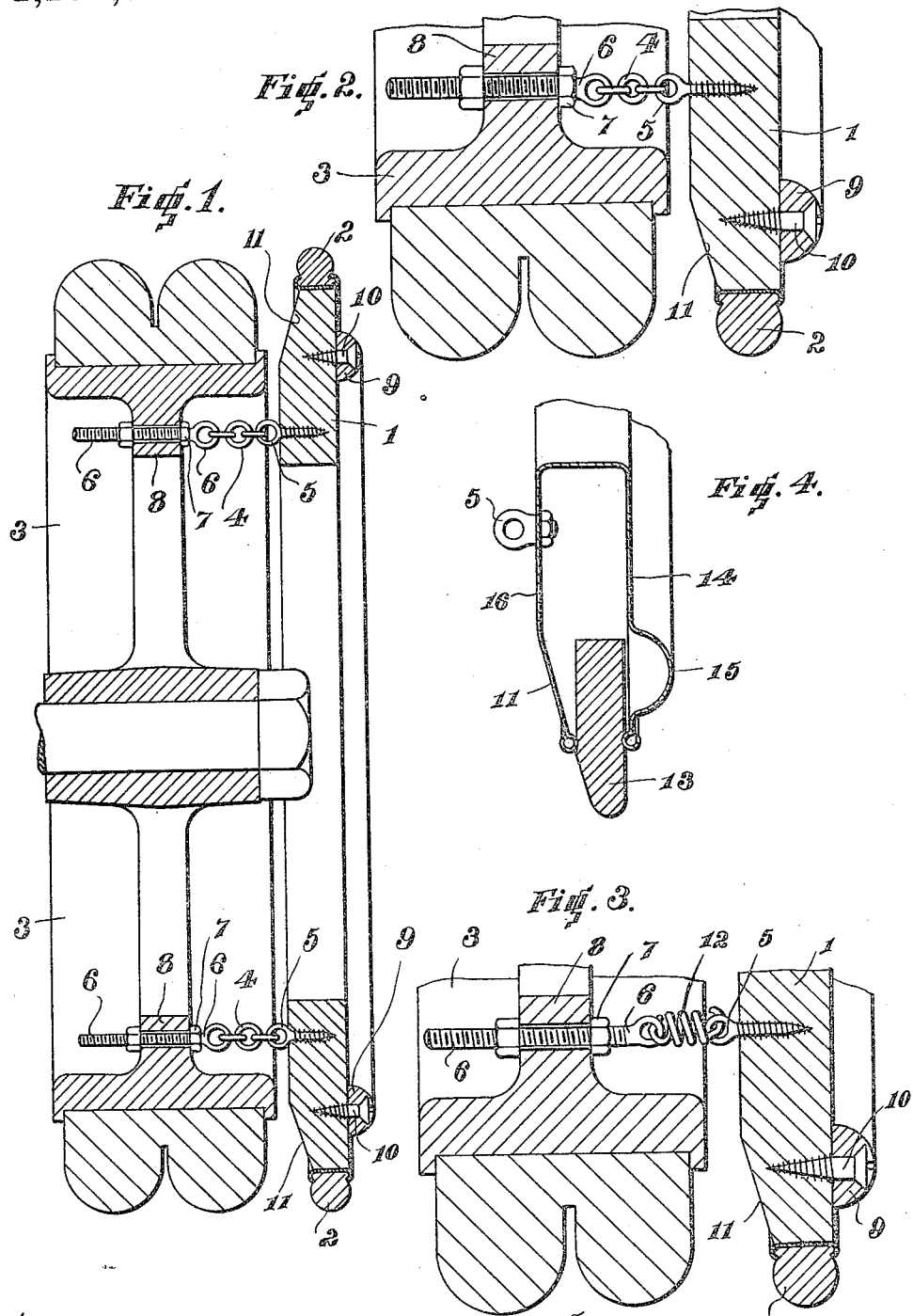

JOHN THOMAS BOWER, OF LONDON, ENGLAND.

SIDE-SPLASH PREVENTER FOR VEHICLE-WHEELS.

1,193,757.   Specification of Letters Patent.   Patented Aug. 8, 1916.

Application filed November 14, 1914. Serial No. 872,247.

*To all whom it may concern:*

Be it known that I, JOHN THOMAS BOWER, subject of the King of Great Britain and Ireland, residing at 12 Florence street, New Cross, London, S. E., England, have invented certain new and useful Improvements in Side-Splash Preventers for Vehicle-Wheels, of which the following is a specification.

This invention relates to improved means for preventing the side splashing of mud and the like by the wheels of motor-buses or other motor or like road vehicles, and has for its object to provide an effective device which is cheap and simple to manufacture and which can readily be fitted to existing wheels, without necessitating any alteration in the construction of the said wheels.

The invention relates to that kind of device which consists of an annular rim or ring, which is flattened in the plane at right angles to its axis, and is of approximately the same diameter as the vehicle wheel, said ring being flexibly connected to the outer side of the wheel so as to be capable of limited movement in any direction in respect thereto, and is adapted to roll over the ground as the wheel rotates.

According to the present invention the annular ring is attached to the wheel by flexible connections which are horizontally disposed in a position substantially parallel to the axle and permit of movement of the ring to and from the wheel in an axial direction as well as radial movement and the inner surface of said ring is inclined in a direction which will deflect downwardly any mud striking it.

The invention will be fully described with reference to the accompanying drawings wherein:

Figure 1 is a vertical section in an axial direction of a road wheel, and a device, according to this invention, applied thereto. Fig. 2 shows on an enlarged scale, the lower portion of Fig. 1. Fig. 3 is a view similar to Fig. 2 showing modified means for connecting the device to the road wheel, and Fig. 4 shows in section, a fragment of a modified form of construction of the splash preventing device.

Referring to Figs. 1 and 3, the device comprises a rim or flat ring 1 of wood or other suitable material, the periphery of which is provided with tire 2 to run on the surface of the road, and which is preferably formed of india-rubber, but may be of other suitable substance. This ring 1 is connected to the road-wheel 3 by means of a plurality of chains 4, two or more at suitable distances apart, one end of each chain 4 being attached preferably to an eyebolt 5 screwed into or otherwise suitably attached to the inner face of the ring 1, the other end of the chain 4 being connected to an eyebolt or its equivalent 6, which is provided with a nut 7 near the eye thereof, the bolt passing through an aperture formed in an inner flange 8 of the wheel rim or through apertures formed through the spokes as found most convenient. By means of this construction the ring 1 is adjustably connected to the wheel 3.

The length of the chains 4 is such as to freely suspend the ring 1 from the wheel 3 in a plane parallel to or approximately parallel to, that containing the wheel.

Upon the outer face of the ring 1, there is preferably provided a protecting hoop 9, of iron, steel, or other suitable material, said hoop 9 being preferably of semi-circular cross section, the flat face of the hoop 9 contacting with the ring 1 to which it is secured by means of screws or bolts 10, said hoop protecting the ring 1 from damage, by contact with curbs or the like.

In order to deflect mud or the like splashed on to the ring 1 by the road wheel, the inner surface of the said ring is made slightly inclined inwardly toward the axis of the wheel 3, as at 11 so that the mud which strikes the inclined face 11 will be directed downward.

In the construction shown in Fig. 3 the connection between each of the eyebolts 5 on the ring 1 and the eyebolts 6 on the wheel 3, is formed by means of a helical tension spring 12, which normally retains the ring 1 to the road wheel 3 but allows the said ring to resiliently move farther from said wheel.

A modified construction of the ring 1 is shown in Fig. 4, according to which modification the ring is formed of sheet steel or the like, bent into channel or trough shaped cross section. Between the inner and outer faces of the ring so formed, a solid preferably india rubber tire 13 is clamped in any suitable manner.

The outer wall 14 of the ring is formed with an annular outwardly projecting corrugation 15, which performs the same office as does the hoop 9 in the construction first described and the outer portion of the inner wall 16 is bent toward the outer wall 14 to provide a deflecting surface 11 for the mud.

It will be seen that the device herein described provides an effective side splash preventer, the said ring always running in contact with the ground, at the outer side of the tread of the road wheel, and its simplicity of attachment to existing road wheels greatly enhances the value of the device.

Although the means for connecting the ring to the road wheel has been described as by chains or helical springs to eyebolts obviously other flexible connections can be employed, such for instance as short lengths of wire rope clamped in any suitable manner to the ring and to the road wheel.

What I claim as my invention and desire to secure by Letters Patent is:—

1. In means for preventing side splash from motor and like vehicles, an annular ring adapted to roll upon the ground adjacent to the vehicle wheel, lateral flexible connections between the vehicle wheel and the annular ring each of said connections comprising a member attached at one end to the wheel by an attachment allowing universal movement and attached at the other end to the guard by an attachment allowing universal movement, and means for adjustably securing these flexible connections to the vehicle wheel to enable the distance between the said wheel and the rolling flange to be varied.

2. In means for preventing side splash from motor and like vehicles, an annular ring adapted to roll upon the ground adjacent to the vehicle wheel, lateral flexible connections between the vehicle wheel and the annular ring each of said connections comprising a member attached at one end to the wheel by an attachment allowing universal movement and attached at the other end to the guard by an attachment allowing universal movement, and means for adjustably securing the flexible connections to the vehicle wheel comprising eye-bolts passing laterally through the vehicle wheel, and nuts upon the screw-threaded portion of the eye-bolts to adjustably clamp them in the desired position in the vehicle wheel.

3. In means for preventing side splash from motor and like vehicles, an annular ring adapted to roll upon the ground adjacent to the vehicle wheel, lateral flexible connections between the vehicle wheel and the annular ring, each of said connections comprising a flexible member attached at one end to the wheel by an attachment allowing universal movement and attached at the other end to the guard by an attachment allowing universal movement, and means for adjustably securing these flexible connections to the vehicle wheel to enable the distance between the said wheel and the rolling flange to be varied.

4. In means for preventing side splash from motor and like vehicles, an annular ring adapted to roll upon the ground surface adjacent to the vehicle wheel, an outwardly inclined inner surface to the annular ring, a rubber tire or tread upon the periphery of the ring, and a protecting ring of metal secured to the outer face of the said ring, and horizontally disposed short lengths of helical spring having hooked ends adapted to engage in eye-bolts on the annular ring and also in eye-bolts adjustably secured in the vehicle wheel by means of nuts upon their screw-threaded portions which serve to adjust and clamp them in lateral holes in the vehicle wheel near the rim.

5. In means for preventing side splash from motor and like vehicles, an annular ring adapted to roll upon the ground adjacent to the vehicle wheel, lateral flexible connections between the vehicle wheel and the annular ring, each of said connections comprising a resilient member attached at one end to the wheel by an attachment allowing universal movement and attached at the other end to the guard by an attachment allowing universal movement, and means for adjustably securing the flexible connections to the vehicle wheel comprising eye-bolts passing laterally through the vehicle wheel, and nuts upon the screw-threaded portion of the eye-bolts to adjustably clamp them in the desired position in the vehicle wheel.

6. In means for preventing side splash from motor and like vehicles, a channeled metal annular ring adapted to roll upon the ground adjacent to the vehicle wheel, an outwardly inclined inner face to said channeled ring, and a protective annular ring upon its outer face, a tire or tread mounted so as to float in the open periphery of the channel, eye-bolts engaging in transverse holes of the vehicle wheel near its rim, nuts on these eye-bolts adapted to adjust and secure them in the transverse holes, eye-bolts secured to the inner face of the annular ring, and a series of horizontally disposed short lengths of helical spring having hooked ends adapted to engage in the eye-bolts on the annular ring and the vehicle wheel.

In witness whereof I have hereunto set my hand in the presence of two witnesses.

JOHN THOMAS BOWER.

Witnesses:
   ALFRED ERNEST BOWER,
   FRANK WILLIAM PATTISON.

Copies of this patent may be obtained for five cents each, by addressing the "Commissioner of Patents, Washington, D. C."